US010456325B2

(12) United States Patent
Fan

(10) Patent No.: US 10,456,325 B2
(45) Date of Patent: Oct. 29, 2019

(54) MICRO FACIAL MASSAGER

(71) Applicant: Shuyin Fan, Shenzhen (CN)

(72) Inventor: Shuyin Fan, Shenzhen (CN)

( * ) Notice: Subject to any disclaimer, the term of this patent is extended or adjusted under 35 U.S.C. 154(b) by 862 days.

(21) Appl. No.: 15/026,248

(22) PCT Filed: Dec. 18, 2013

(86) PCT No.: PCT/CN2013/089895
§ 371 (c)(1),
(2) Date: Mar. 31, 2016

(87) PCT Pub. No.: WO2015/085616
PCT Pub. Date: Jun. 18, 2015

(65) Prior Publication Data
US 2016/0235622 A1    Aug. 18, 2016

(30) Foreign Application Priority Data

Dec. 12, 2013    (CN) .......................... 2013 1 0681749

(51) Int. Cl.
*A61H 23/02*    (2006.01)
*H01M 2/10*    (2006.01)
(Continued)

(52) U.S. Cl.
CPC ...... *A61H 23/0263* (2013.01); *H01M 2/1044* (2013.01); *A61H 7/005* (2013.01);
(Continued)

(58) Field of Classification Search
CPC ........ A61H 23/0263; A61H 2201/5025; A61H 7/005; H01M 2/20; H01M 2/1044; H01M 2220/30
See application file for complete search history.

(56) References Cited

U.S. PATENT DOCUMENTS 5,552,240 A * 9/1996 Derstine ............. H01M 2/1044
429/100
5,980,309 A * 11/1999 Frantz ................... H05K 3/301
439/500
(Continued)

FOREIGN PATENT DOCUMENTS

CN    0644953 A    2/1994
CN    2212388 Y    11/1995
(Continued)

OTHER PUBLICATIONS

Shen, Yanyan, the International Search Report, dated Sep. 2014, CN.

(Continued)

*Primary Examiner* — Quang D Thanh

(57) ABSTRACT

A micro facial massager includes a housing, a circuit board, a driving motor, an eccentric wheel arranged on an output shaft of the driving motor, a massage piece, batteries received by a battery box which is positioned in a placed groove. A through hole is defined in a bottom of the placed groove. The battery box is dismountable and is insertable into the housing. The micro facial massager further includes two metal connectors, where the two metal connectors are corresponding fixed in the housing and are connected with the circuit board. When the battery box is inserted into the housing, the two metal connectors press an anode and a cathode of the battery, respectively. Thus, it is convenient to only open the battery box to replace the batteries.

8 Claims, 3 Drawing Sheets

(51) Int. Cl.
*H01M 2/20* (2006.01)
*A61H 7/00* (2006.01)
(52) U.S. Cl.
CPC ....... *A61H 2201/5025* (2013.01); *H01M 2/20* (2013.01); *H01M 2220/30* (2013.01)

(56) References Cited

U.S. PATENT DOCUMENTS

| | | | | |
|---|---|---|---|---|
| 2006/0058714 | A1* | 3/2006 | Rhoades | A45D 24/007 601/73 |
| 2007/0003826 | A1* | 1/2007 | Hsu | H01M 2/1044 429/97 |
| 2010/0222719 | A1* | 9/2010 | Cowie | A61H 7/005 601/46 |
| 2012/0251864 | A1* | 10/2012 | Blaha | H05K 3/301 429/100 |

FOREIGN PATENT DOCUMENTS

| | | | |
|---|---|---|---|
| CN | 201108577 Y | 9/2008 | |
| CN | 201271354 Y | 7/2009 | |
| CN | 202715027 U | 2/2013 | |
| CN | 203677501 U | 7/2014 | |
| GB | 276797 A * | 9/1927 | ............. H01M 4/02 |
| JP | 07114910 A | 5/1995 | |
| JP | 087862 A | 1/1996 | |
| TW | 279988 U | 11/2005 | |

OTHER PUBLICATIONS

Shen, Yanyan, the International Searching Authority written comments, dated Sep. 2014, CN.

* cited by examiner

MICRO FACIAL MASSAGER

TECHNICAL FIELD

The present disclosure relates to the field of massagers, and more particularly to a micro facial massager.

BACKGROUND

Applicant has designed a micro facial massager that includes a housing, a circuit board arranged in the housing, a driving motor, an eccentric wheel arranged on an output shaft of the driving motor, and a massage piece arranged on an outside surface of the housing, where the massage piece and the eccentric wheel are arranged on a same end of the housing. The driving motor is connected with the circuit board by wires. The driving motor is powered on causing the output shaft of the driving motor rotates. Rotation of the output shaft of the driving motor drives rotation of the eccentric wheel. A first side of the eccentric wheel is heavy and a second side of the eccentric wheel is light, and the eccentric wheel is a half-cylinder structure. The rotation of the eccentric wheel generates shaking. The housing includes a face housing and a bottom housing, where the driving motor and the eccentric wheel are arranged on an inside surface of the face housing, and the massage piece is arranged on a corresponding outside surface of the face housing. The shaking of the eccentric wheel causes shaking of the massage piece, which achieves a massage effect of the micro facial massager. Batteries are arranged in the micro facial massager, the housing is configured with a placed cabin, and the batteries are arranged in a placed cabin of the micro facial massager. Metal connector is arranged on the place cabin, and the metal connector is connected with the circuit board by the wires. The batteries are arranged in the housing, thus, the batteries are replaced by opening the housing, which is inconvenient.

SUMMARY

The aim of the present disclosure is to provide a micro facial massager capable of being convenient to replace the batteries.

The aim of the present disclosure is achieved by the following methods:

A micro facial massager, comprising: a housing, a circuit board, a driving motor, an eccentric wheel arranged on an output shaft of the driving motor, a massage piece, batteries, two metal connectors, and a placed groove arranged on a battery box and positioned by the batteries. A bottom of the placed groove is configured with a through hole. The battery box is dismountable and is insertable into the housing, and the two metal connectors are corresponding fixed in the housing and are connected with the circuit board by the wires. When the battery box is insertable into the housing, the two metal connectors press an anode and a cathode of the battery, respectively.

Furthermore, a first side of the housing is configured with two supporting structures that hold up the battery box, and the two supporting structures are symmetrical, which makes the battery box place on the supporting structure and conveniently insert into the housing or pull out from the housing.

Furthermore, a second side of the housing is configured with two structures that limit and fix the battery box, and the two limiting structures correspond with the two supporting structures, respectively which makes the battery box closely fix.

Furthermore, two sides of the battery box are configured with sliding structures that match with the supporting structure and the limiting structure. A top end of the sliding structure is configured with a clamp, and a front end of the supporting structure is configured with a stuck column that matches with the clamp, which makes the battery box limit and fix in the housing. When the battery needs to be replaced, the battery box is pulled out, and the clamp is broken away from the stuck column, which is convenient to replace the battery.

Furthermore, thickness of the clamp gradually increases from a top of the clamp from a top of the clamp until the thickness of the clamp has no change, and the struck column is a circular structure, which makes the clamp conveniently fix the struck column.

Furthermore, an opening is arranged between the sliding structures, which make the sliding structures have elasticity, is convenient to flex for the sliding structures, and save material.

Furthermore, the battery box is configured with a convex edge to form a placed groove, and the convex edge is an arc-shaped structure. A middle part of the convex edge is configured with a plurality of reinforcing ribs that are uniformly arranged. Height of connecting end of the reinforcing ribs is equal with height of the convex edge, and height of the other end of the reinforcing ribs gradually decreases. When the battery box is insertable into the housing, the metal connector presses the battery box to push the battery box, and the metal connector gradually slides and finally presses the battery, which makes the metal connector conveniently match with the battery.

Furthermore, a second end of the metal connector matched with the battery is an arched structure; a front end of the second end of the metal connector is configured with a folded-over, which makes the metal connector have good elasticity and good flex, thus, the metal connector effectively matches with the battery, further avoids the front end of the second end of the metal connector stopping inserting of the battery box.

Furthermore, a first end of the metal connector is configured with a hot-melt hole, the housing is configured with a hot-melt column, and the first end of the metal connector is configured with a connecting end. The connecting end is welded with the wire, and one end of the wire is connected with the circuit board, which makes the battery provide the power for the micro facial massager, further makes the micro facial massager convenient to use.

Furthermore, a recess is arranged on a connection position between the housing and the battery box, which is convenient to put finger in the recess, further conveniently opening the battery box.

The present disclosure puts the battery in the battery box, and the battery box is dismountable and is insertable into the housing. The two metal connectors are connected with the circuit board by the wires. When the battery box is insertable into the housing, the two metal connectors press an anode and a cathode of the battery, respectively. Thus, it is convenient to only open the battery box to replace the batteries.

Figure 1:
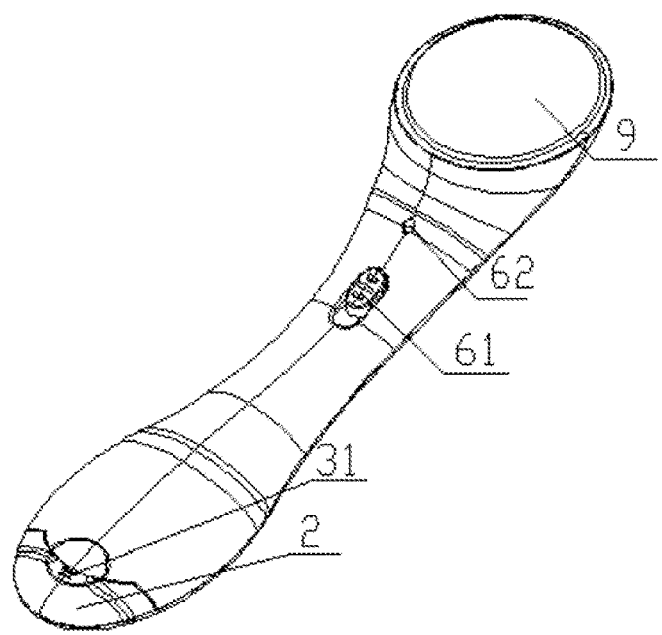
FIG. 1 is an overall schematic diagram of a micro facial massager of an example of the present disclosure.

Legends: 1. bottom housing; 11. supporting structure; 12. stuck column; 13. hot-melt column; 2. battery box; 21. placed groove; 22. through hole; 23. sliding structure; 24. clamp; 25. opening; 26. reinforcing rib; 27. convex edge; 28. bulge; 3. face housing; 31. recess; 4. metal connector; 41. hot-melt hole; 42. connecting end; 43. folded-over; 5. batteries; 6. circuit board; 61. switch; 62. indicator light; 7. driving motor; 71. driving motor fixed shell; 8. eccentric wheel; 9. massage piece.

DETAILED DESCRIPTION

The present disclosure will further be described in detail in accordance with the figures and the exemplary examples.

As shown in FIG. 1 to FIG. 5, a micro facial massager of the present disclosure comprises a housing, a circuit board 6, a driving motor 7, an eccentric wheel 8 arranged on an output shaft of the driving motor 7, a massage piece 8, batteries 5 and a placed groove 21 arranged on a battery box 2 and positioned by the batteries 5. A bottom of the placed groove 21 is configured with a through hole 22. The battery box 2 is dismountable and is insertable into the housing. The micro facial massager further comprises two metal connectors 4, where the two metal connectors are corresponding fixed in the housing and are connected with the circuit board 6 by the wires. When the battery box 2 is insertable into the housing, the two metal connectors 4 press an anode and a cathode of the battery, respectively. Thus, it is convenient to only open the battery box 2 to replace the batteries.

Figure 2:
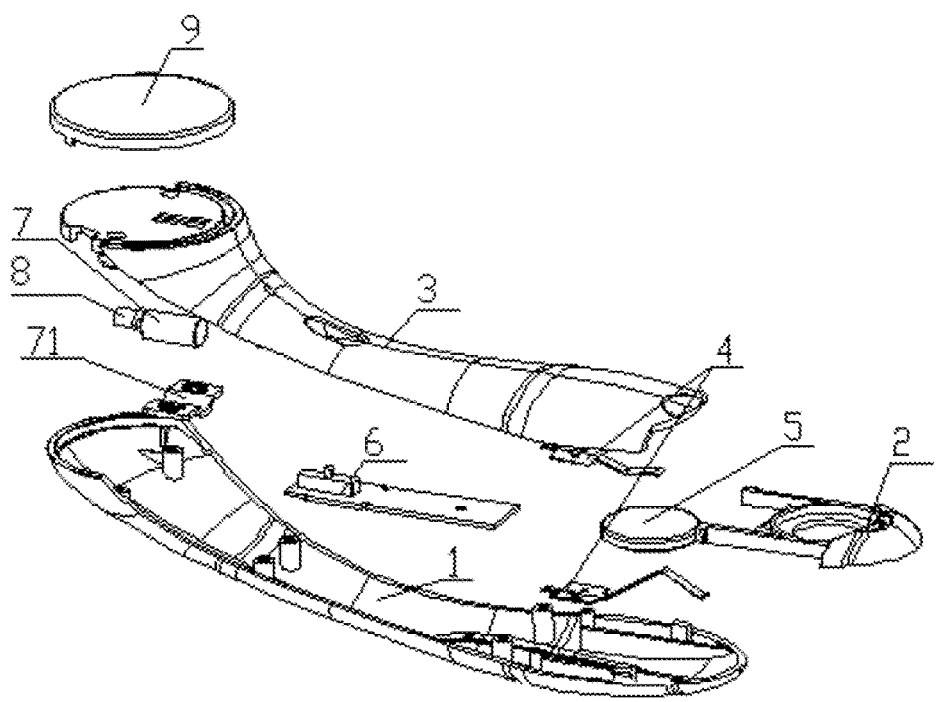
FIG. 2 is a split schematic diagram of a portion of the micro facial massager of the example of the present disclosure.
Figure 4:
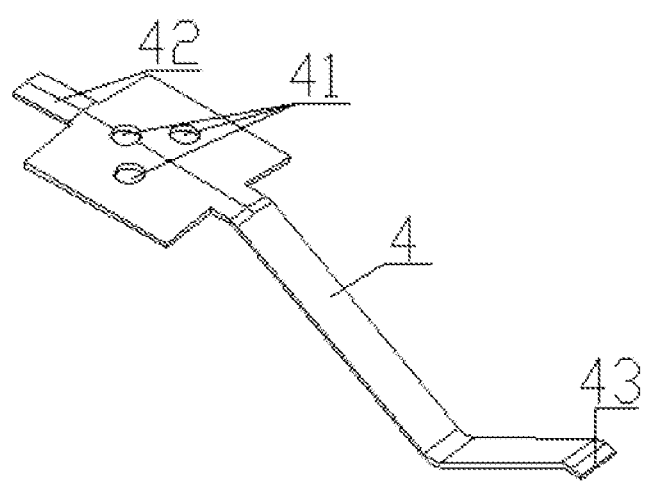
FIG. 4 is a structural diagram of a metal connector of the example of the present disclosure.
Figure 5:
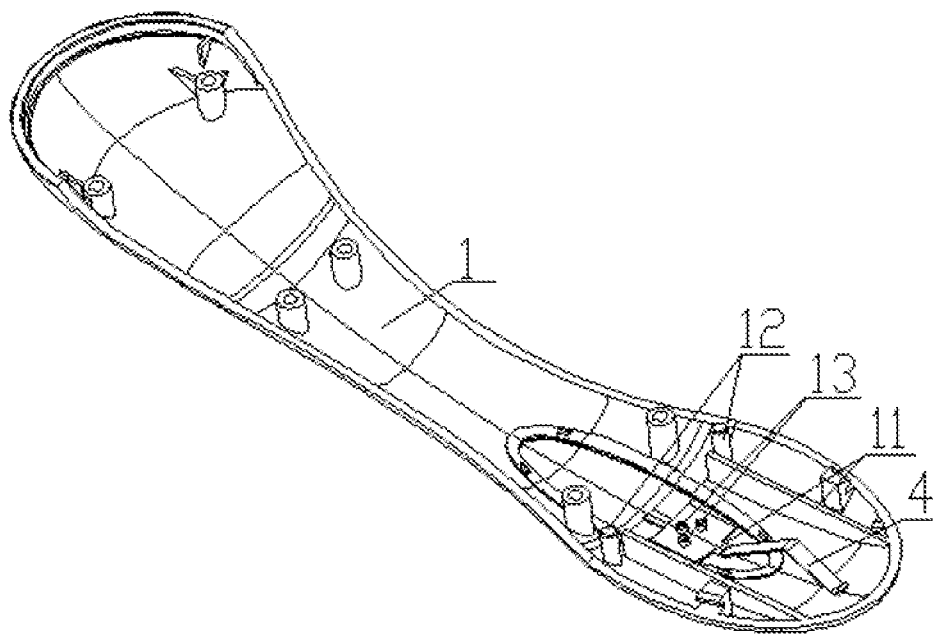
FIG. 5 is a schematic diagram of the metal connector c led with a bottom housing of the example of the present disclosure.

As shown in FIG. 2, the battery box 2 is insertable into a first end of the housing, and the first end of the housing is configured with a dodging hole that is convenient to insert by the battery box 2. A second end of the housing is configured with a massage piece 9. The housing comprises a face housing 3 and a bottom housing 1. The dodging hole is arranged between the face housing 3 and the bottom housing 1, one of the two metal connectors 4 is fixed on the face housing 3 and the other of the two metal connectors 4 is fixed on the bottom housing 1. With reference to FIG. 4 and FIG. 5, a first end of the metal connector 4 is configured with a hot-melt hole 41, the face housing 4 is configured with a hot-melt columns 13, and the bottom housing 1 is configured with a hot-melt columns 13, where the two metal connectors 4 are fixed on the bottom housing 1 and the face housing 3 by hot-melt, thus furthering fixing the metal connector 4 in the housing. The first end of the metal connector 4 is configured with a connecting end 42 that protrudes outside where the connecting end 42 is connected with the wire, and one end of the wire is connected with the circuit board 6. When the battery box 12 and the battery are together inserted into the housing, the two metal connectors 4 press the anode and the cathode of the battery, which makes the battery 5 provide the power for the micro facial massager, further making the micro facial massager convenient to use.

As shown in FIG. 5, the bottom housing 1 is configured with two supporting structures 11 that hold up the battery box 2, and the two supporting structures 11 are symmetrical, which makes the battery box place on the supporting structure and conveniently insert into the housing or pull out from the housing. Correspondingly, the face housing is configured with two limiting structures (not shown in drawing) that limit and fix the battery box, where the two limiting structures correspond with the two supporting structures, respectively, which makes the battery box closely fix. With reference to the FIG. 2 and FIG. 3, two sides of the battery box 2 are configured with sliding structures 23 that match with the supporting structure 11 and the limiting structure 22. When the battery box 2 is inserted into the housing, the supporting structure 11 matches with the limiting structure 22, which is convenient to control the battery box 2. A top end of the sliding structure 23 is configured with a clamp 24, and a front end of the supporting structure 11 is configured with a stuck column 12 that matches with the clamp 24. When the battery box 2 is insertable into the housing, the clamp 24 matches with the stuck column 12, which makes the battery box 2 limit and fix in the housing. When the battery 5 needs to be replaced, the battery box 2 is pulled out, and the clamp is broken away from the stuck column 12, which makes it convenient to replace the battery 5.

Figure 3:
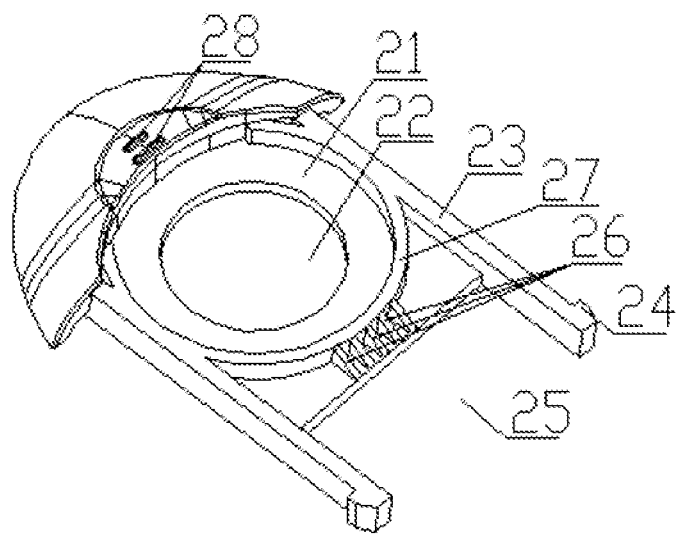
FIG. 3 is a structural diagram of a battery box of the example of the present disclosure.

As show in FIG. 2, in order to conveniently pull out the battery box 2, a recess is arranged on a connection position between the face housing 1 and the battery box 2, and the recess is a circular structure, which is convenient to put a finger in the recess 31 and further conveniently opening the battery box 2. As shown in FIG. 3, the recess 31 is configured with a bulge 28, and the bulge 28 is a stripe structure, which is more convenient to open the battery box 2.

As shown in FIG. 3, thickness of the clamp 24 gradually increases from a top of the clamp until the thickness of the clamp has no change, which makes the clamp 24 conveniently fix the struck column 12. As shown in FIG. 5, the struck column 12 is a circular structure, which is convenient to open the battery box, and the clamp is broken away from the stuck column 12 with less force, which is convenient to replace the battery 5 and use.

As shown in FIG. 3, an opening is arranged between the sliding structures 23, which make the sliding structures 23 have elasticity, is convenient to flex for the sliding structures 23 and save material.

As shown in the FIG. 4, the first end of the metal connector 4 is connected. With the circuit board, and a second end of the metal connector 4 matches with the battery is an arched structure, which makes the metal connector 4 have good elasticity and good flex, thus, the metal connector 4 effectively matches with the battery 5. A front end of the second end of the metal connector 4 is configured with a folded-over, which avoids the front end of the second end of the metal connector from stop inserting into the battery box 2.

As shown in FIG. 3, the battery box is configured with a co vex edge 27 to form a placed groove 21, where the convex edge 27 is an arc-shaped structure. A middle part of the convex edge 27 is configured with a plurality of reinforcing ribs 26 that are uniformly arranged. Height of connecting end of the reinforcing ribs 26 is equal with height of the convex edge 27, and height of the other end of the reinforcing ribs 26 gradually decreases. With reference to the FIG. 2 and FIG. 5, when the battery box 2 is insertable into the housing, the metal connector 4 presses the battery box 2 to push the battery box 2, and the electric metal connector 4 gradually slides and finally presses the battery 5, which makes the metal connector conveniently match with the battery 5.

In the example, it should be understood that the housing is configured with a battery cover that seals the battery in the housing. And it should be understood that the battery box also uses other way to insert into the housing.

As shown in the FIG. 1, the circuit board 6 is configured with a switch 61 and an indicator light 62. As shown in FIG. 2, the driving motor 7 is fixed on the face housing 3 by a driving motor fixed shell 71. The driving motor fixed shell 71 matches with the face housing 3 by a screw, which makes the driving motor firmly fix on the face housing 3.

The present disclosure is described in detail in accordance with the above contents with the specific exemplary examples. However, this present disclosure is not limited to the specific examples. For the ordinary technical personnel of the technical field of the present disclosure, on the premise of keeping the conception of the technical personnel can also make simple deductions or replacements, and all of which should be considered to belong to the protection scope of the present disclosure.

I claim:

1. A micro facial massager, comprising:
   a housing;
   a circuit board;
   a driving motor;
   an eccentric wheel arranged on an output shaft of the driving motor;
   a massage piece;
   at least one battery positioned in a placed groove of a battery box;
   two metal connectors; and
   wherein a through hole is defined in a bottom of the placed groove; the battery box is dismountable and is insertable into the housing; the two metal connectors are corresponding fixed in the housing and are connected with the circuit board; the two metal connectors press an anode and a cathode of the at least one battery when the battery box is inserted into the housing, respectively; two supporting structures are formed on a first side of the housing to hold up the battery box, and two sliding structures are formed on two sides of the battery box to engage with the two supporting structures, respectively; a clamp is formed on a top end of each of the two sliding structures, a stuck column is formed on a front end of each of the two supporting structures to engage with the clamp.

2. The micro facial massager of claim 1, wherein the two supporting structures are symmetrical.

3. The micro facial massager of claim 1, wherein thickness of the clamp gradually increases from a top of the clamp until the thickness of the clamp has no change and the stuck column is a circular structure.

4. The micro facial massager of claim 1, wherein an opening is arranged between the two sliding structures.

5. The micro facial massager of claim 4, wherein the placed groove is formed by a convex edge of the battery box, and the convex edge is an arc-shaped structure; a plurality of reinforcing ribs are uniformly arranged in a middle part of the convex edge; a height at connecting end of the reinforcing ribs is equal to a height of the convex edge, and gradually decreases toward an opposite end of each of the reinforcing ribs.

6. The micro facial massager of claim 1, wherein a contact part of the metal connector contacted with the battery is an arched structure: a folded-over is arranged in a front end of the contact part metal connector.

7. The micro facial massager of claim 6, wherein a first end of the metal connector defines a hot-melt hole, the housing includes a hot-melt column, and a connecting end is formed in the first end of the metal connector.

8. The micro facial massager of claim 7, wherein a recess is arranged on a position connecting the housing and the battery box.

* * * * *